United States Patent [19]
Davis

[11] 3,958,269
[45] May 18, 1976

[54] COLOR SUBCARRIER FREQUENCY COMPARATOR

[75] Inventor: Dicky D. Davis, Boulder, Colo.

[73] Assignee: The United States of America as represented by the Secretary of Commerce, Washington, D.C.

[22] Filed: Aug. 20, 1974

[21] Appl. No.: 499,102

[52] U.S. Cl. ................................. 358/10; 324/88
[51] Int. Cl.² ......................................... H04N 9/62
[58] Field of Search ............... 178/69.5 CB, DIG. 4; 358/10, 1; 324/88, 78 R, 121 R, 79 R, 79 D; 331/19, 20, 44; 340/366 CA

[56] References Cited
UNITED STATES PATENTS

| | | | |
|---|---|---|---|
| 2,814,775 | 11/1957 | Kummer | 324/88 |
| 2,904,630 | 9/1959 | Bruch et al. | 178/5.8 R |
| 3,292,083 | 12/1966 | Presbrey | 324/88 |
| 3,526,707 | 9/1970 | Skinner et al. | 358/10 |
| 3,591,710 | 7/1971 | Uetake et al. | 178/5.8 R |
| 3,850,412 | 11/1974 | Olson | 324/88 |

Primary Examiner—George H. Libman
Attorney, Agent, or Firm—Eugene J. Pawlikowski; David Robbins; Alvin Englert

[57] ABSTRACT

Apparatus for measuring the frequency of a reference signal which utilizes the color subcarrier signal of a television receiver as a standard frequency signal. In a first embodiment, the reference signal controls a circuit to develop bursts of a synthesized color subcarrier signal, gated at the horizontal line rate of a color television receiver. The synthesized signal is superimposed on the broadcast television signal and applied to the receiver to produce a modulation bar on the screen. Any frequency/phase difference between synthesized and broadcast color subcarrier signals will cause the modulation bar to move laterally across the screen, and/or cause the sequence of colors within the modulation bar to vary. Movement of the modulation bar is a coarse indication of frequency difference and change of the color sequence within the bar is a precise indication of phase difference.

In a second embodiment, the locally synthesized color subcarrier signal and the color subcarrier signal of the television receiver are compared in a linear phase comparator to develop a signal having an instantaneous voltage proportional to the phase difference between the two signals. The phase signal controls a generator which develops a cursor line on the screen. Movement of the line across the screen provides a coarse indication of phase difference between the subcarrier signals. The phase signal is also applied to a digital counter which affords a precise readout of the phase difference between the signals.

12 Claims, 5 Drawing Figures

COLOR SUBCARRIER FREQUENCY COMPARATOR

BACKGROUND OF THE INVENTION

1. Field of the Invention

The present invention is related to a frequency/phase comparator, and more particularly to color subcarrier frequency comparator which may be employed to calibrate oscillators used as frequency standards.

2. Description of the Prior Art

There generally exists two methods of measuring or calibrating oscillators which are utilized as frequency standards. One method utilizes a digital counter to readout the frequency difference directly. The foregoing, however, is generally limited to an accuracy of eight or nine digits. Another accepted method is to compare the phase of a known precise received signal with that generated by the local oscillator to be calibrated, as is done in most of the broadcast type comparison systems available today. All broadcast calibration systems suffer from degradation of accuracy due to variations of the propagation path. Ionospheric path changes limit the accuracy of HF radio (2.5 – 25 MHz) to about $\pm 1 \times 10^{-8}$ under the best conditions. VLF and LF broadcasts in the frequency range 10 to 100 KHz are less affected by propagation conditions and are used when calibration accuracy requirements exceed $\pm 1 \times 10^{116\ 8}$. Most standards laboratories in the United States monitor the phase of the 60 KHz carrier broadcast by radio station WWVB. In order to calibrate an oscillator to $\pm 1 \times 10^{-10}$, the user must typically make phase recordings of the WWVB signal for 24 hours. Considerable time and operator skill are required to interpret the phase recordings.

It would therefore be desirable to have an apparatus for accurately calibrating an oscillator to an accuracy of at least $\pm 1 \times 10^{10}$ in about 100 seconds, with relatively inexpensive components.

SUMMARY OF THE INVENTION

In a conventional television network, a transmitter located at the station modulates a radio frequency signal with a color burst for each scan of a television receiver. The color burst is derived from an atomically controlled oscillator located at the network origination point. The RF signal is demodulated in a conventional television receiver where the color oscillator is phase-locked to the recovered color bursts. In this way, the color oscillator in the receiver is phase-locked to an atomically controlled oscillator.

It is an object of the present invention to provide an apparatus for measuring the frequency of a reference signal, which utilizes as a standard frequency signal the precision color subcarrier signal of a conventional color television receiver.

Another object of the present invention is to provide a precision frequency/phase comparator which provides a means for adjusting a local frequency standard to an accuracy of at least $\pm 1 \times 10^{10}$ in less than 100 seconds by utilizing as a standard frequency signal the color subcarrier signal of a television receiver, which is phase-locked to a network atomically controlled color subcarrier signal.

These and other objects are attained in accordance with the present invention by the provision of an apparatus in which a synthesizer produces bursts of a color subcarrier signal which is phase-locked to the reference signal to be calibrated or measured. The synthesized subcarrier signal is gated at the horizontal line rate of a conventional television receiver and is used to amplitude modulate the RF signal received from a television network. The modulated signal is applied to the receiver and is processed as normal picture chrominance information which appears on the screen of the receiver as a modulation bar.

When the frequency difference between the synthesized and broadcast subcarrier signals is large, the modulation bar will move to the left on the screen if the synthesized frequency is high compared to the frequency of the broadcast signal and to the right if the synthesized frequency is low. Further, the "hue" of the colors in the modulation bar will depend upon the phase relation between the broadcast and synthesized frequencies. As the phase relation changes through 360°, the color of the bar will take on all the values from red-green-blue-red. The order of the changes in colors indicates whether the synthesized frequency is high or low relative to the broadcast frequency. For small frequency differences, the change sequence will be red-green-blue-red when the synthesized frequency is high compared to the broadcast frequency and red-blue-green-red when the synthesized frequency is low. Thus, the movement of the modulation bar across the screen provides information that may be used in a coarse adjustment of the reference frequency while the hue change sequence within the bar provides information for a fine adjustment.

In another embodiment, the reference signal to be calibrated drives a phase-locked synthesizer to produce a color subcarrier signal. The phase of the synthesized color subcarrier signal is compared in a linear phase comparator with the phase of the color subcarrier signal obtained from a conventional color television receiver. The output of the comparator is a sawtooth ramp signal having an instantaneous voltage proportional to the phase difference between the synthesized and receiver subcarrier signals. The output of the phase comparator is processed and applied to an input of a cursor generator which also receives, as another input, the horizontal sync signal developed by the television receiver. The output of the generator is connected to the receiver which develops a cursor line on the screen. The movement of the line across the screen provides an indication of the phase difference between the synthesized and receiver subcarrier signals. The phase ramp signal is processed further and applied to a digital counter to provide a precise readout of the phase difference between the signals.

It will be understood that embodiments of the present invention may be used throughout the electronics industry for calibrating oscillators utilized as frequency standards, such as for example, oscillators in digital frequency counters, frequency meters, radio transmitters, and the like.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
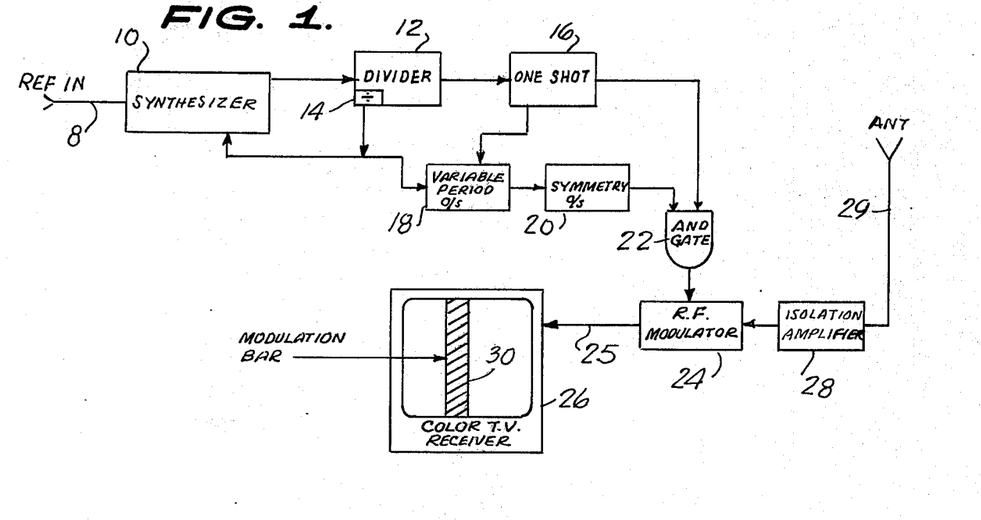
FIG. 1 is a block diagram illustrating a preferred embodiment of the present invention.

Referring now to FIG. 1, there is illustrated in block diagram form an embodiment of the color subcarrier comparator of the present invention in which a conventional color television receiver 26 is utilized in a frequency/phase measuring apparatus with a resolution of approximately ± 10 nsec.

Although it is understood that the network color subcarrier frequency is the 455th harmonic of one-half the horizontal line scanning frequency, or 3.579545 MHz., the latter will be referred to hereinafter, for the sake of brevity, as the 3.58 MHz. color subcarrier signal.

In FIG. 1, the frequency of the reference signal to be compared is coupled to input line 8 of a synthesizer 10 which contains a crystal oscillator phase-locked to the reference signal. The synthesizer preferably operates at a frequency substantially equal to a binary multiple frequency of the color subcarrier signal. In the example that is described below, the synthesizer operates at two times the color subcarrier frequency, i.e., 7.16 MHz. The phase-locked oscillator within synthesizer 10 utilizes a harmonic phase-lock such that 3.58 MHz = 63/88 times the frequency of the reference signal input. If the reference signal input frequency is taken to be approximately 5 MHz, for example, it can be appreciated that the foregoing equation represents the same synthesis ratio used by the television networks to generate the color burst signal from a 5 MHz atomic frequency standard. The locally generated 3.58 MHz signal, which appears at the output of divider 14, will therefore bear the same frequency relationship to the reference input signal as the network color subcarrier bears to its 5 MHz atomic standard. It is noted that the local frequency applied at line 8 may be 5 MHz or 5 MHz divided by any integer, with the maximum value for the integer being determined by the locking characteristic of the phase-locked oscillator within synthesizer 10.

The output of synthesizer 10, which consists of the phase locked 7.16 MHz signal, is fed to a frequency divider or countdown circuit 12 which is utilized to produce a signal at the horizontal sync rate (15, 734 Hz) which is subsequently fed to a one shot circuit 16. The 7.16 MHz output from synthesizer 10 is also divided by 2 by divider 14 the output of which is fed back to synthesizer 10 as part of the phase-locking operation. The output from divider 14 is also fed as a 3.58 MHz input to a rainbow modulator 18 which comprises a one shot circuit whose normal period is lengthened from about 100 ns to 220 ns by virtue of its other input from horizontal line one shot circuit 16. The capacitively coupled negative transition from circuit 16 to circuit 18 will exponentially decay, so that by the end of the 12 μs one-shot period of circuit 16, the period of the rainbow modulator 18 will have returned to 100 ns. The other output from one shot circuit 16 is fed to an input of AND gate 22 which receives as its other input the output of a symmetry one shot circuit 20. One shot 20 receives the period varying 3.58 MHz signal from rainbow modulator 18 and delivers to AND gate 22 a symmetrical 3.58 MHz signal whose phase is modulated by about 160° once each horizontal line. The output of AND gate 22 is therefore a series of 3.58 MHz bursts which are gated at the horizontal line rate.

The 3.58 MHz bursts from AND gate 22 are fed to an RF modulator 24 which receives as its other input the incoming RF signal from antenna 29 after being fed through a standard isolation amplifier 28. Accordingly, the signal appearing on line 25 at the output of RF modulator 24 consists of the normal RF signal with modulated bursts of the locally synthesized 3.58 MHz signal at the horizontal sync rate.

A standard color television receiver 26 receives at its antenna terminals the signal appearing on line 25. Receiver 26 processes the superimposed modulation as normal picture chrominance information which will appear on the screen of receiver 26 as a vertical colored bar 30. The hue of color bar 30 will depend on the phase relationship between the broadcast color burst received at antenna 29 and the locally generated color burst from AND gate 22. If the frequency difference between the two input signals is relatively large (e.g. ± 10 Hz.) color bar 30 will be seen to move to the left if the local frequency of the reference input is higher than its setting, or to the right if the local frequency is low. Further, as the phase relationship between the two signals changes through 360°, the color of the superimposed bar 30 will assume all colors from red-green-blue-red, etc. The order of the change in colors will indicate whether the frequency of the locally generated 3.58 MHz. signal is high or low relative to the broadcast color burst. It should be appreciated that the movement of color bar 30 across the screen of receiver 26 provides a coarse adjustment of the reference frequency input signal, while the hue change sequence within color bar 30 provides a fine adjustment of the reference frequency input signal. For fine adjustment, i.e. small frequency differences between the locally generated color burst and the network color burst, the hue change sequence may be observed to be red-green-blue-red when the local frequency is high, and red-blue-green-red when the local frequency is low.

Figures 2, 3:
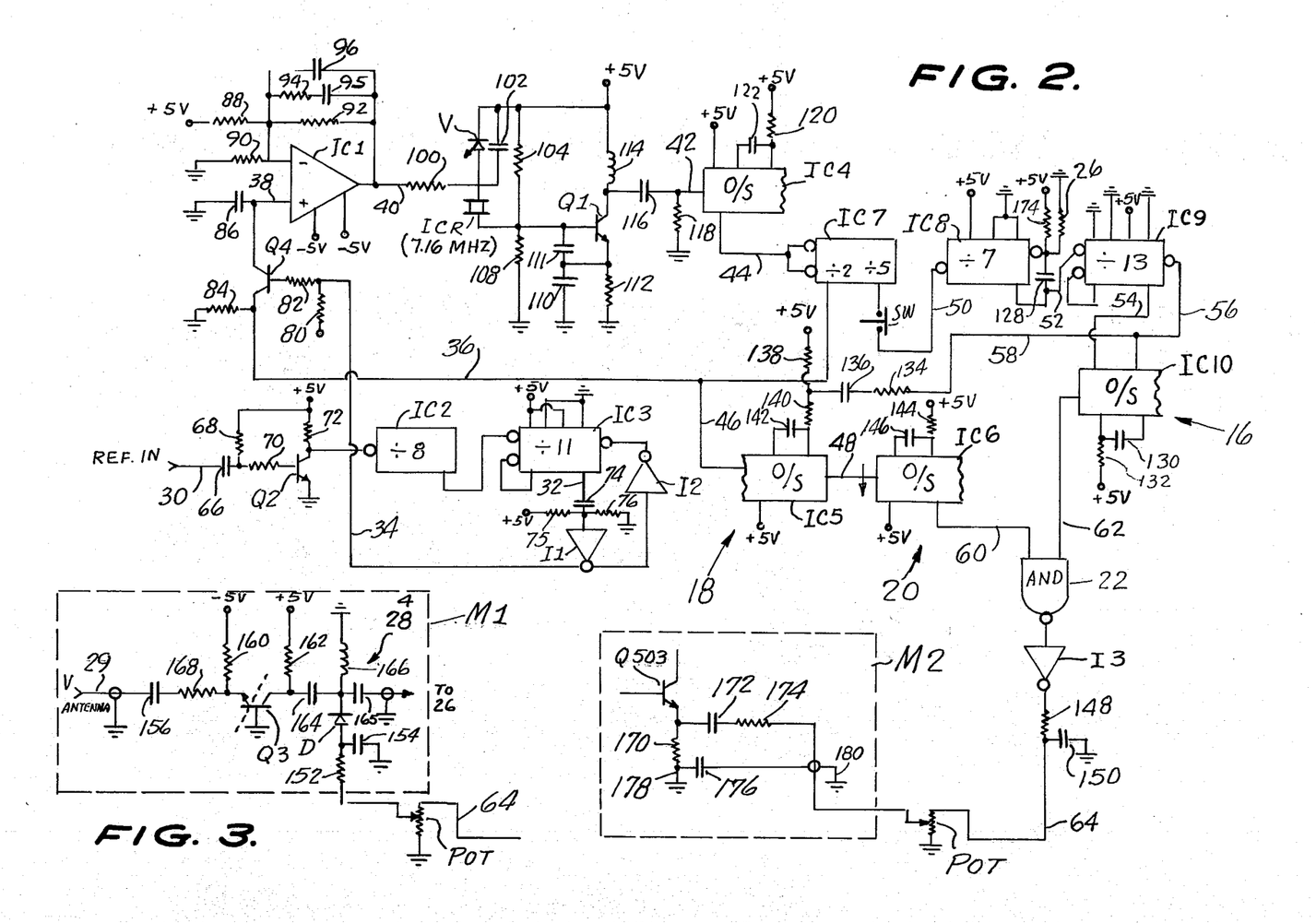
FIG. 2 is a detailed schematic diagram of the preferred embodiment illustrated in FIG. 1.
FIG. 3 is a schematic circuit diagram of an alternative output coupling circuit for the first embodiment.

Referring now to FIG. 2, there is shown a detailed schematic circuit diagram of the embodiment just described with reference to FIG. 1, the sole exception being the inclusion of a video chroma interface, designated by the reference M2, which receives the locally generated color bursts in the chroma band pass amplifier Q503 of the television receiver. The alternative circuitry which corresponds to the isolation amplifier 28 and RF modulator 24 of FIG. 1 is illustrated in FIG. 3 designated generally by the reference M1. It is understood that either of the circuits M2 shown in FIG. 2 or M1 shown in FIG. 3 may be utilized in an equally effective manner to couple out the locally generated color burst signal.

Again with reference to FIG. 2, the local signal desired to be measured or calibrated is designated as "REF IN" and is applied to a signal conditioner or buffer transistor Q2 through input line 30. Signal conditioner Q2 switches at the zero crossings of the input signal between zero and 5 volts to convert REF IN to logic level for driving the integrated circuit divider represented by IC2 and IC3. IC2 is a divide by 8 frequency divider, whereas IC3 is connected in a divide by 11 configuration. The buffered signal from Q2 is accordingly fed through IC2 and IC3 to deliver at line 32 an output pulse every 88th cycle of the reference signal input at line 30. The output of IC3 is fed through a differentiator, represented by capacitor 74 and resistors 76 and 78, to provide a very short pulse of, for example, 100 nsec., which is fed through an inverter I1 to the base 34 of transistor Q4. Transistor Q4 is part of a voltage controlled phase-locked crystal oscillator which also includes an operational amplifier IC1 and an oscillator Q1 which has varactor control of frequency by means of a varacap diode V. Transistor Q4 functions as a phase comparator which receives as its input the 100 nsec. strobe signal at its base 34 and a 3.58 MHz. signal delivered at its emitter 36. The signal on line 36 is derived from the divide by 2 output of IC7 which, in turn, receives the 7.16 MHz. output of oscillator Q1. The one-shot circuit IC4 buffers the output from the voltage controlled crystal oscillator Q1 along line 42 and its output on line 44 drives the frequency divider IC7.

The output of synthesizer 10, which includes the above described phase-locked crystal oscillator, is seen to be phase-locked to the 88th sub-harmonic of the frequency of the reference signal input such that REF IN × 63/88 = 3.58. For the purpose of illustration, we can assume that REF IN is approximately 5 MHz. Accordingly, the 100 nsec. pulse appearing at the base 34 of transistor Q4 is generated once each 88 cycles of the 5 MHz. signals. Since the emitter 36 of transistor Q4 has a continuous replica of 3.58 MHz. present from IC7, the 3.58 MHz. signal is seen to be gated ON for 100 nsec. each 63 cycles of the 3.58 MHz. signal and each 88 cycles of the MHz. signal. Any error in the phase difference between the signal appearing at the base 34 and emitter 36 of transistor Q4 will appear at the collector 38 of transistor Q4 to be applied to the non-inverting input of operational amplifier IC1. Amplifier IC1 functions as an integrator and delivers at its output line 40 a DC error signal. The error signal at line 40 acts as a control voltage to change the bias on varactor V which, in the well known manner, will change its junction capacitance to alter the resonant frequency of Colpitts oscillator Q1. The end effect is that the integrated control voltage at line 40 causes the phase of oscillator Q1 to change in a manner which brings the error voltage down to a constant. Thus, the desired action of the phase-locked loop, in the well known manner, is to maintain the two input signals in a constant phase relationship which is achieved by bringing the output of integrator IC1 to a constant voltage to drive oscillator Q1 at a constant frequency. Accordingly, a fixed phase relationship is achieved, in the well known manner, between each 63 cycles of the 3.58 MHz. signal and each 88 cycles of the 5 MHz. reference signal.

As noted above, the reference signal input frequency may be 5 MHz. or 5 MHz. divided by any integer. For example, if the reference signal input frequency is 1 MHz., synthesizer 10 operates in the same manner except that instead of comparing once each 88 cycles of 5 MHz., the comparison will be made once each 88 cycles of 1 MHz. Thus, in this case, only one-fifth of the samples will be effectuated as compared with the 5 MHz. input signal, but the phase relationship will remain the same. Of course, design limitations on the phase-locked loop provide a lower limit of an acceptable reference input frequency signal.

The feedback components of operational amplifier IC1, namely resistors 92 and 94 and capacitors 96 and 98, are chosen to provide sufficient gain such that phase comparator transistor Q4 will not provide too large an output variation. Further, the feed back components reduce the gain of IC1 to an acceptable level to eliminate the significance of any parameter variations in the integrated circuit.

The frequency divider circuitry 12 comprises integrated circuit dividers IC7, IC8 and IC9 which act to derive the horizontal line frequency (15, 734 Hz.) from the output 44 of IC4 which is 7.16 MHz. One output of IC7, as described above, is a divide by 2 which feeds the 3.58 MHz. signal along line 36 to phase comparator Q4. Another output of IC7 provides a divide by 5 signal which is fed via line 50 to the input of IC8. Line 50 includes a reset switch SW. Frequency divider IC8 is connected in a divide by 7 configuration whose output is delivered along line 52 to divider IC9. Divider IC9 is utilized as a preset divider; each time it reaches a count of 16, it is strobed to an initial count of 5, so that it actually divides by 11, except for the connection 56 from one-shot circuit IC10 which holds IC9 in its preset state for two counts such that the actual division ratio of divider IC9 is 13.

The output of divider IC9 is applied via line 54 to one-shot circuit IC10 which delivers at line 62 a series of pulses, approximately 12 $\mu$sec. wide, which repeat at the horizontal sync rate. Line 62 is connected to one input of AND gate 22. The negative going 12 $\mu$sec. pulse from the $\overline{Q}$ output of one-shot IC10 is used to preset divider IC9, as described above, via line 56, and is further utilized to change the period of the rainbow phase modulator 18, which comprises a one-shot circuit IC5, via line 58. One-shot circuit 18 continuously runs at 3.58 MHz. by virtue of its connection to the divide by 2 output of divider IC7 via line 46. The negative pulse coupled from IC10 through line 58 and the differentiating network represented by resistor 134 and capacitor 136 cause the period of the pulses at the output line 48 of one-shot circuit IC5 to increase from approximately 100 nsec. to approximately 220 nsec. During the 12 $\mu$sec. that the $\overline{Q}$ output of IC10 is low, the voltage across capacitor 136 decays to its final value, and the period of the signal at output 48 of one-shot circuit IC5 decreases from 220 nsec. back to 100 nsec.

Accordingly, each time one-shot IC10 pulses, a sudden shift occurs in the phase of the negative transitions of the pulses at output line 48 of IC5, with a gradual 12 $\mu$sec. return back to the initial phase. Symmetry circuit 20, which may comprise a one-shot circuit IC6, is triggered by each negative transition from one-shot circuit IC5. The period of one-shot circuit IC6 is set by means of resistor 144 and capacitor 146 to 140 nsec., which is a half cycle of 3.58 MHz. Accordingly, the output of one-shot circuit IC6 appearing at line 60 is a symmetrical 3.58 MHz. signal whose phase is modulated by about 160° once each horizontal line. The output from one-shot circuit IC6 at line 60 is fed to the other input of AND gate 22 which delivers bursts of the 3.58 MHz. signal at the horizontal line rate.

Since the change in phase of the 3.58 MHz signal provided by rainbow phase modulator 18 is translated, as is well known, into a change in hue by a color television receiver, the end effect is to create a portion of a rainbow on the television screen. The width of the rainbow is determined by the length of time that one-shot circuit IC10 enables the 3.58 MHz. signal through AND gate 22. For the 12 μsec. gate time utilized above, the rainbow will occupy about one-quarter of the visible screen width. If the frequency difference between the reference input signal is relatively large (e.g. ± 10 Hz.) the rainbow bar will move to the left of the screen if the local frequency is high and to the right if the local frequency is low. If the frequency difference is small, the rainbow will progress through the color gamut from red-green-blue, red-green-blue, etc., with the progression of colors moving either to the left or to the right depending on whether the reference input signal is high or low, respectively, in frequency.

Further with reference to FIG. 2 is shown one method of coupling the locally generated color burst to the TV receiver wherein circuit M2 represents a typical video chroma interface circuit of a standard television receiver. The locally generated color subcarrier bursts are fed from AND gate 22 through an inverter I3 and an RC circuit comprised of resistor 148 and capacitor 150 which eliminates higher order components of the 3.58 MHz signal which are within the band width of the signal received at the antenna of the TV. The signal on line 64 is fed through an adjustable potentiometer to the input of chromaband pass amplifier M2. The potentiometer provides means for varying the amount of modulation which may be applied to the receiver. In this version of the circuit, the locally synthesized 3.58 MHz. signal is injected into the video chroma interface M2 which normally handles the chrominance signal of the color television receiver. Ground wire 178 represents the TV ground, while ground line 180 represents the comparator ground. Capacitor 176, coupled between the two grounds 178 and 180, provides a means for coupling the 3.58 MHz. signal into the receiver without actually grounding the hot AC chassis of the set and is selected to represent a low impedance at 3.58 MHz. and a relatively high impedance at 60 Hz. A capacitor 172 and resistor 174 must also be added to the normal video chroma band pass amplifier Q502 for isolation to prevent the locally generated color bursts from upsetting the normal function of band pass amplifier Q503. The interface provided by circuit M2 results in a very pleasing display on the screen of the receiver, but requires the addition of capacitors 172 and 176 and resistor 174 to the TV receiver.

An alternative connection between the locally synthesized 3.58 MHz. bursts and the television receiver is depicted in FIG. 3, which is seen to comprise the isolation amplifier 28 and RF modulator 24 of FIG. 1. In this embodiment, the normal RF TV signal is received at at antenna 29 and is fed through an isolation amplifier comprised of transistor Q3 to the cathode of a diode modulator D. Isolation amplifier 28 prevents reradiation of the 3.58 MHz. signal back through the TV antenna. Diode modulator D functions as an attenuation modulator wherein the color bursts received at line 64 are used to attenuation modulate the RF signal fed to the TV antenna. This method of coupling is desirable in that it does not require modification of the receiver in any way. It may occur, however, that the modulation process will create spurious sidebands which degrade the quality of the color bar, in which case the embodiment shown in FIG. 2 may be preferable.

One exemplary utilization of the color subcarrier comparator according to the first embodiment of the present invention might be to set the frequency of a digital counter oscillator as follows. First, one would connect the 1 MHz. or 5 MHz. output of the counter to the synthesizer and tune in a TV program known or suspected to originate from a network. The manual reset switch SW is reset until the subcarrier modulation bar is positioned in the center half of the TV screen. Then, the frequency of the counter-oscillator is adjusted; first to halt any left-right movement of the subcarrier modulation bar, and secondly to halt any hue changes in the bar. Since a phase change of 10 nsec. (approximately 15°) will be quite perceptible, it is possible to adjust the local oscillator to within the 10 nsec tolerance in an observation time of approximately 100 seconds, which corresponds to a setting accuracy of $1 \times 10^{10}$.

Since the network color subcarriers are operating from frequency standards that are offset approximately $-300 \times 10^{-10}$ from the U.S. atomic frequency standard, the locally set oscillator will also be offset by the same amount. If it is desired to set the local oscillator to atomic frequency as closely as possible, the following procedure may be utilized:

1. From the NBS Time and Frequency Services Bulletin, (Available by writing to Frequency-Time Broadcast Services Section, National Bureau of Standards, Boulder, Colorado 80302) determine the exact offset of the network being monitored.

2. Compute the time required for 1 cycle of phase change between the network subcarrier and an atomic subcarrier.

$T = t/\text{offset} = 279.3 \text{ns}/300 \times 10^{-10} = 9.31$ seconds.

$t$ = period of subcarrier $T$ = time required for 1 cycle phase change

Offset = NBS published value (assumed $-300 \times 10^{-10}$, actually varies $\pm 5 \times 10^{-10}$)

3. Set the local oscillator such that the modulation bar goes through a color gamut red-blue-green-red once each 9.31 seconds. (With this sequence, the local oscillator is higher in frequency.)

For greater accuracy, the counter may be utilized in its manual start-stop mode and 10 cycles of change (i.e., 93.1 seconds) may be timed. (Note that an error of 0.1 second in 100 seconds equals $3 \times 10^{-11}$.) Checks may be made on all networks to ensure maximum accuracy. In each case, T may be computed from the Time and Frequency Services Bulletin.

It should be noted that if less accuracy is desired (say $\pm 1 \times 10^{-7}$), a black and white receiver may be used. In this case, the local oscillator need only be set to the point where the modulation bar is stationary.

It is therefore seen that the color subcarrier comparator of the first embodiment of the present invention provides a means of adjusting a frequency standard to an accuracy of at least $\pm 1 \times 10^{10}$ using the atomically controlled network color subcarriers as a reference. The comparator itself may be compact and relatively inexpensive. The companion color (or black and white) television receiver does not necessarily require any modification to be used with this embodiment. The measurement accuracies achieved in one minute of measurement time exceed the typical capability of HF transmissions by three orders of magnitude ($1 \times 10^7$ vs $1 \times 10^{10}$). Only Loran-C and LF-VLF transmissions have greater measurement accuracy which are generally achieved at much greater cost and require measurement times of several hours or days.

The following is a listing of component values suitable for the circuitry shown in FIGS. 2 and 3. It is of course understood that the following listing, as well as the specific component interconnections shown in FIGS. 2 and 3, are only exemplary in that many other configurations could be utilized within the spirit and scope of the present invention.

| COMPONENT | | VALUE OR MFG. DESIG. |
|---|---|---|
| Capacitor | 66 | .01 μf. |
| " | 74 | 100 pf. |
| " | 86 | 220 pf. |
| " | 96 | .01 μf. |
| " | 98 | 0.1 μf. |
| " | 102 | Select for + lv. at IC1 OUTPUT (LINE 40) |
| " | 106 | 270 pf. |
| " | 110 | 330 pf. |
| " | 116 | .001 μf. |
| " | 122 | 10 pf. |
| " | 128 | 68 pf. |
| " | 130 | 1500 pf. |
| " | 136 | .0047 μf. |
| " | 142 | 10 pf. |
| " | 146 | 20 pf. |
| " | 150 | 100 pf. |
| " | 172 | 100 pf. |
| " | 176 | .01 μf. |
| " | 156 | .001 μf. |
| " | 164 | .001 μf. |
| Capacitor | 168 | .001 μf. |
| " | 154 | 100 pf. |
| Resistor | 68 | .33 KΩ |
| " | 70 | 1 KΩ |
| " | 72 | 2.2 KΩ |
| " | 76, 78 | 2 KΩ |
| " | 80 | 1 KΩ |
| " | 82 | 2.2 KΩ |
| " | 84 | 680 Ω |
| " | 88 | 47 KΩ |
| " | 90 | 10 KΩ |
| " | 92 | 200 KΩ |
| " | 94 | 10 KΩ |
| " | 100 | 100 KΩ |
| " | 104 | 100 KΩ |
| " | 108 | 100 KΩ |
| " | 112 | 2.2 KΩ |
| " | 118 | 1.8 KΩ |
| " | 120 | 5 KΩ |
| " | 124 | 2 KΩ |
| " | 126 | 2 KΩ |
| " | 132 | 27 KΩ |
| " | 134 | 1 KΩ |
| " | 138 | 1 KΩ |
| " | 140, 144 | 5 KΩ |
| " | 148 | 470 Ω |
| " | 174 | 2.7 KΩ |
| " | 170 | 330 Ω |
| " | 158 | 75 Ω |
| " | 160 | 470 Ω |
| " | 162 | 220 Ω |
| " | 152 | 680 Ω |
| Inductor | 114, 116 | 10 μh |
| Potentiometer | POT | 1 KΩ range |
| Transistor | Q2 | 2N4275 |
| " | Q4 | 2N4275 |
| " | Q1 | 2N3904 |
| " | Q3 | 2N3904 |
| Integrated | Circuit IC1 | Signetics 741V |
| " | IC2, IC3, IC8, IC9 | " 8281 |
| " | IC4, IC5, IC6, IC10 | 74123 |
| " | IC7 | 8280 |
| " | I1, I2, I3 | 7404 |
| Diode | D | 1N4148 |
| Varactor | V | Motorola MV1628 |

Figure 4:
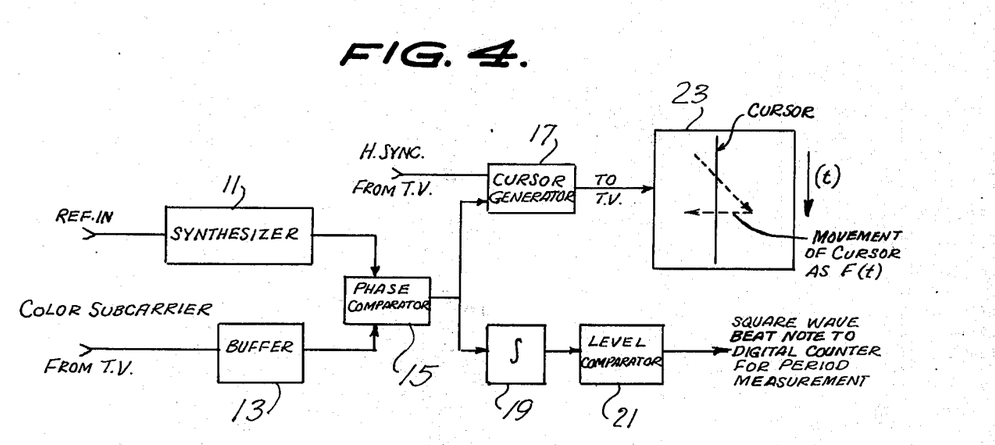
FIG. 4 is a block diagram illustrative of a second preferred embodiment of the present invention.

Referring now to FIG. 4, there is shown an overall block diagram of an alternative embodiment of the color subcarrier frequency comparator according to the present invention. This embodiment requires slight modification of the conventional color television reciever to provide its 3.58 MHz. signal and horizontal sync signal to the comparator. The signal to be calibrated, indicated as a "REF IN" signal, is preferably 5 MHz and drives synthesizer 11. Synthesizer 11 is of the same general configuration as the synthesizer 10 of the first embodiment, with the exception that its phase-locked oscillator operates at 3.58 MHz, rather than 7.16 MHz of the first embodiment. The output from synthesizer 11 is fed to one input of a phase comparator 15 which receives as its other input a buffered version of the 3.58 MHz. signal from the television receiver. The output of the linear phase comparator 15 is a sawtooth ramp signal having an instantaneous voltage proportional to the phase difference of the two input signals. A wideband replica of this phase ramp is processed by a cursor generator 17 which receives as another input the horizontal sync signal from the television receiver. The output of cursor generator 17 is connected to the TV video circuits and provides a visual indication 23 of the phase on the screen of the receiver, as will be explained in more detail hereinafter. The phase ramp from phase comparator 15 is also processed through a low-pass filter 19 and a level comparator 21 to supply a square wave of the beat note to a digital counter. The beat note is defined as the time required for the reference signal to lose or gain phase equal to one cycle of 3.58 MHz. The period of the beat note will typically be about nine seconds with a scatter of ± 0.03 seconds. The cursor output on screen 23 provides a coarse indication of phase difference, while the digital counter output provides a precise output indication of phase without requiring any human interface.

Figure 5:
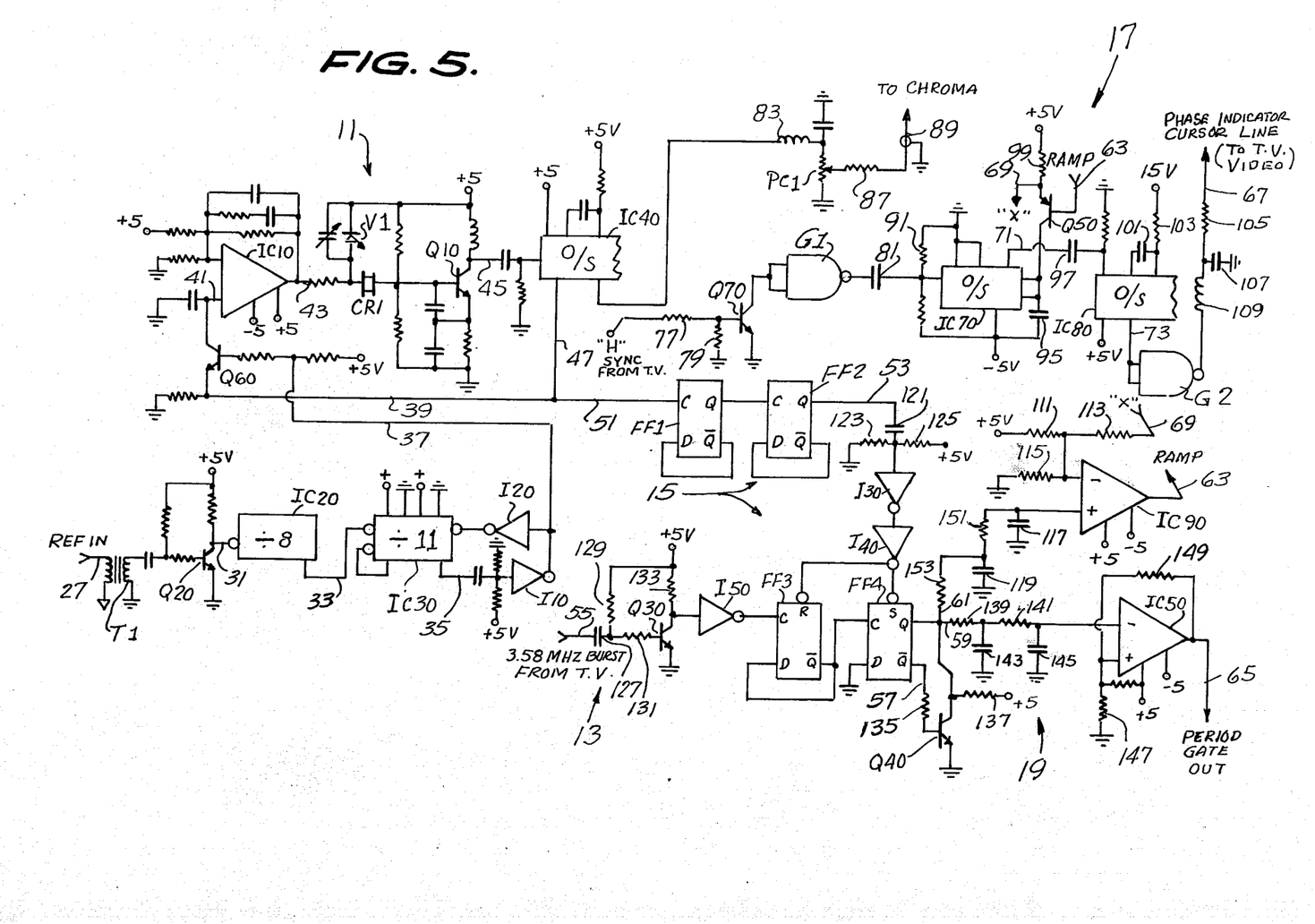
FIG. 5 is a detailed schematic circuit diagram of the second embodiment of the present invention illustrated in FIG. 4.

Referring now to FIG. 5, there is shown a detailed schematic circuit diagram of the embodiment depicted in FIG. 4. The implementation of the 3.58 MHz. synthesizer 11 is seen in FIG. 5 to be similar to the configuration shown with respect to the first embodiment in FIG. 2, the only difference being the provision of a 3.58 MHz. crystal CR1 in oscillator Q10. The reference signal is fed in on line 27 through an isolation transformer T1 and is buffered by transistor Q20 and then divided by 88 by integrated circuit dividers IC20 and IC30. The output signal is fed from inverter I10 along line 37 to the base of phase comparator Q60. The other input to phase comparator Q60 is the synthesized 3.58 MHz. signal from line 47 of IC40. Phase comparator Q60 senses any difference in phase of the signals along lines 37 and 39 and provides an output signal at line 41 to the noninverting input of operational amplifier IC10. Any phase error between the two signals is amplified by operational amplifier IC10 whose output at line 43 controls the frequency/phase of the voltage controlled crystal oscillator Q10 through the varactor diode V1.

The phase-locked 3.58 MHz. signal at line 47 of one-shot circuit IC40 is applied as one input to the linear phase comparator 15 which comprises integrated circuit flip-flops FF1, FF2, FF3, and FF4. The other input to the phase comparator 15 is the 3.58 MHz. burst from the television receiver's local 3.58 MHz. oscillator. The latter signal, fed in along line 55, is buffered by transistor Q30 and inverted by an inverter I50 before being applied as the clock pulse to flip-flop FF3. It is noted that flip-flops FF1 and FF2 are connected in a divide by 4 configuration to supply an output pulse at line 53 once every four cycles of the synthesized 3.58MHz. input signal at line 51. The output at line 53 is fed through a differentiating circuit comprising capacitor 121 and resistors 123 and 125, and thereafter inverters I30 and I40 to supply reset pulses to flip-flops FF3 and FF4 each four cycles of the synthesized 3.58 MHz. signal. This configuration defines the leading edge of the pulses from the $\bar{Q}$ output fed to transistor Q40. The trailing edge of this pulse depends upon the phase relationship between the reset pulse applied to flip-flop FF3 and the 3.58 MHz. signal from the TV applied through inverter I50. That is, when flip-flop FF3 is reset, the next positive going transition into its clock input from IC50 will cause flip-flop FF3 to toggle but will not effect flip-flop FF4. The second clock transition from I50 will accordingly cause flip-flop FF3 to toggle back in the other direction which will terminate the pulse out of flip-flop FF4 to transistor Q40. Accordingly, the resultant output to transistor Q40 is a rectangular pulse whose leading edge begins with the reset pulse and whose trailing edge terminates on the second positive going pulse into the clock input of flip-flop FF3. This produces a rectangular wave at line 57 whose duty cycle varies from approximately 25 percent to 50 percent as the relative phase of the two 3.58 MHz. signals changes by 360°. The output from transistor Q40 is a sawtooth ramp which runs typically from 0.8 volts to 1.6 volts having an instantaneous voltage proportional to the phase difference of the two 3.58 MHz. input signals. Each complete cycle of the sawtooth ramp represents a 360° phase difference between the two input signals.

The ramp voltage output of transistor Q40 is applied to lines 59 and 61 to two separate integrator/low-pass filters for providing the precision digital output and the visual cursor line coarse indicator, respectively. The signal along line 59 passes through a low-pass filter comprising resistors 139 and 141 and capacitors 143 and 145 designed to have a cutoff frequency of less than approximately 1 Hz. A low cutoff frequency is desirable to minimize the noise bandwidth of the digital period gate output. For precise frequency calibrations, the period of the output beat note will be approximately 10 seconds. IC50 is selected as a high gain operational amplifier with about 10 percent hysteresis included to provide fast and positive transitions. The output of integrated circuit IC50 along line 65 is a square wave whose period is equal to the beat note of the two 3.58 MHz. signals. The output along line 65 may be coupled to, for example, a start-stop digital counter to provide a direct indication of the beat note, or may alternatively be fed to a special purpose counter that computes the frequency offset directly.

The low-pass filter at the input of the integrated circuit IC90, which comprises resistors 151 and 153 and capacitors 117 and 119, is designed to have a cutoff frequency of approximately 300 Hz. This relatively wide bandwidth for the cursor beat note signal allows coarse setting of oscillators whose frequencies may be initially in error by as much as $5 \times 10^{-4}$. Integrated circuit IC90 buffers the output of the low-pass filter and level shifts the control voltage to make the output at line 63 compatible with the cursor generator control transistor Q50. The cursor generator 17 consists essentially of a variable period one-shot circuit IC70, a second one-shot circuit IC80, and a control transistor Q50 which receives as its enabling voltage the output ramp from integrated circuit IC90 along line 63. The variable period one-shot IC70 is triggered by the horizontal sync pulses from the television receiver applied through buffer transistor Q70 and gate G1. The output from control transistor Q50 is applied to the period controlling inputs of one-shot circuits IC70 such that the output signals from IC70 along line 71 have a period which varies from about 25 μsec. to 40 μsec. depending on the control voltage applied to transistor Q50. The trailing edge of the output of IC70 along line 71 triggers one-shot circuit IC80. The output of one-shot circuit IC80 is fed through line 73 and gate G2 to the television video circuits via line 67. Accordingly, the output of IC80 is mixed with the television video signal to provide a bright dot on each horizontal line of the television picture. The combination of all the dots generated by one-shot IC80 forms a vertical line on the television screen. The position of this vertical cursor line is dependent on the period of one-shot circuit IC70 which, in turn, is controlled by the voltage from integrated circuit IC90. The position of the cursor on the screen will therefore be proportional to the phase difference of the two 3.58 MHz. signals. A choke 109 is included in the output line 67 to isolate RF interference from the video circuits. The resistance of resistor 105 is selected in accordance with the particular television receiver to provide a suitable brightness of the cursor line.

The cursor line produced thereby is intended as a diagnostic aid for the comparator of the present invention, while the output of integrated circuit IC50 along line 65 may be utilized for precision measurement. The cursor line will respond to beat notes up to several kHz, thus indicating when the reference input signal is far off its set frequency. The beat note period out from line 65 will respond up to approximately 0.5 Hz.; however, when the reference input signal is properly adjusted, the beat note will be approximately 0.1 Hz. (one cycle each 9.3 seconds). It will be appreciated that the cursor line produced thereby provides a convenient indication of sensing whether the reference input signal is high or low in frequency depending upon whether the cursor scans left and flies back right, or scans right and flies back left. If, for example, the difference input signal is set high, the cursor will scan slowly left to right and will fly back right to left.

It is seen that I have provided in this second embodiment a precision frequency/phase comparator which provides both a coarse adjustment via the cursor line and a fine adjustment via the beat note period output. Although this second embodiment requires three connections to the television receiver, since the beat note period may be made digitally, the resolution will only be limited by the stability of the reference input signal and the phase stability of the television signal's propagation path. One skilled in the art will appreciate that additional circuits may be added that completely automate the computation of the frequency offset to provide a readout thereof in parts in $10^{11}$.

Following is a listing of values of components which may be utilized in the circuitry of the second embodiment depicted in FIG. 5, with the understanding that they are only exemplary and that many other combinations of compenents and interconnections will be apparent to a skilled technician.

| COMPONENT | | VALUE OR MFG. DESIG. | |
|---|---|---|---|
| Transistor | Q20, Q60, Q40, Q30, Q70 | | 2N4275 |
| " | Q10 | | 2N3904 |
| " | Q50 | | 2N3906 |
| Integrated Circuit | IC10, IC50, IC90 | Signetics | 741 |
| " | IC20, IC30 | " | 8281 |
| " | IC40, IC80 | " | 74123 |
| " | FF1, FF2, FF3, FF4 | " | 7474 |
| " | IC70 | " | 555V |
| " | G1, G2 | " | 7400 |
| " | I10, I20, I30, I40, I50 | " | 7404 |

-continued

| COMPONENT | | VALUE OR MFG. DESIG. |
|---|---|---|
| Capacitor | 85 | 100 pf. |
| " | 81 | 220 pf. |
| " | 95 | .0022 µf. |
| " | 97 | 100 pf. |
| " | 101 | 220 pf. |
| " | 107 | 200 pf. |
| " | 121 | 50 pf. |
| " | 127 | .01 µf. |
| " | 143 | 50 µf. |
| " | 145 | 10 µf. |
| " | 117 | .01 µf. |
| " | 119 | .1 µf. |
| Resistor | 87 | 1 KΩ |
| " | 77 | 47 KΩ |
| " | 79 | 2.2 KΩ |
| " | 91 | 5 KΩ |
| " | 93 | 10 KΩ |
| " | 99 | 10 KΩ |
| " | 103 | 5 KΩ |
| " | 105 | 4.7 KΩ |
| " | 111 | 470 KΩ |
| " | 113 | 100 KΩ |
| " | 115 | 120 KΩ |
| " | 123, 125 | 2 KΩ |
| " | 129 | 33 KΩ |
| " | 131 | 2.2 KΩ |
| " | 133 | 2.7 KΩ |
| " | 135 | 4.7 KΩ |
| " | 137 | 1 KΩ |
| " | 139 | 4.7 KΩ |
| " | 141 | 27 KΩ |
| " | 147 | 4.7 KΩ |
| " | 148 | 15 KΩ |
| " | 149 | 220 KΩ |
| " | 153 | 2 KΩ |
| " | 151 | 18 KΩ |
| Varactor | V1 | MV1620 |
| Inductor | 83, 109 | 10 µh. |
| Potentiometer | POT1 | 1 KΩ range |

Obviously, numerous modifications and variations of the present invention are possible in light of the above teachings. It is therefore to be understood that within the scope of the appended claims the invention may be practiced otherwise than as specifically described herein.

What is claimed as new and is desired to be secured by Letters Patent of the United States is:

1. Apparatus for measuring the frequency of a reference signal which utilizes as a standard frequency signal the color subcarrier signal of a color television receiver, which comprises:
   synthesizer means for producing a first signal which is phase-locked to said reference signal and has a frequency substantially equal to an integral multiple of the frequency of said color subcarrier signal;
   first frequency divider means responsive to said first signal for producing a second signal having a frequency at the horizontal sync rate of said color television receiver;
   means further responsive to said first signal for producing a third signal having a frequency equal to a predetermined submultiple of said first signal;
   gating means for producing a fourth signal which comprises bursts of said third signal at the rate of said second signal;
   means for amplitude modulating an incoming RF television signal by means of said fourth signal; and
   a color television receiver connected to receive the output from said modulating means.

2. The apparatus according to claim 1, wherein said synthesizer means comprises:
   second frequency divider means responsive to said reference signal for producing a strobe signal every 88th cycle of said reference signal;
   phase comparator means for producing a phase signal proportional to the difference in phase between said strobe signal and each 63rd cycle of said third signal;
   means for integrating said phase signal to produce a d-c control signal; and
   voltage controlled oscillator means for producing, in response to said control signal, said first signal.

3. The apparatus according to claim 2 further comprising means connected between said means further responsive to said first signal and said gating means, for shifting the phase of said third signal once every cycle of said second signal.

4. The apparatus according to claim 1, wherein said modulation means comprises a diode attenuation modulator which receives said fourth signal at its anode and said RF television signal coupled through an isolation amplifier at its cathode.

5. The apparatus according to claim 1, wherein said modulating means comprises the chroma band pass amplifier of said color television receiver.

6. Apparatus for measuring the frequency of a reference signal which utilizes as a standard frequency signal the color subcarrier signal of a color television receiver, which comprises:
   synthesizer means for producing a first signal which is phase-locked to said reference signal and has a frequency equal to the frequency of said color subcarrier signal;
   a color television receiver having a color subcarrier local oscillator and a source of horizontal sync pulses;
   means for producing a first control signal whose instanteous voltage is proportional to the phase difference between said first signal and said color subcarrier signal; and
   means triggered by said horizontal sync pulses and delayed in accordance with the amplitude of said first signal for producing a bright dot on each horizontal line of the television receiver and thereby generating a vertical cursor line on the screen of said television receiver whose instantaneous horizontal position on said screen is dependent on said phase difference, whereby said vertical cursor line moves slowly from left to right and then flies back, or vice versa, as said phase difference increases or decreases from zero through 360°.

7. The apparatus according to claim 6, further comprising means responsive to said first control signal for generating a second control signal whose period is equal to the time required for said reference signal to lose or gain phase equal to one cycle of the frequency of said color subcarrier signal.

8. The apparatus according to claim 7, further comprising first and second low-pass filters each connected to receive said first control signal and to deliver their integrated outputs respectively to said cursor line generating means and said second control signal generating means.

9. The apparatus according to claim 6, wherein said synthesizer means comprises:
   frequency divider means responsive to said reference signal for producing a strobe signal every 88th cycle of said reference signal;

phase comparator means for producing a phase signal proportional to the difference in phase between said strobe signal and each 63rd cycle of said first signal;

means for integrating said phase signal to produce a d-c control signal; and voltage controlled oscillator means responsive to said control signal for producing said first signal.

10. The apparatus according to claim 8, wherein said cursor line generating means comprises:

a first one-shot circuit which is triggered by said horizontal sync pulses from said television receiver;

control transistor means responsive to said integrated output of said first low-pass filter for varying the period of the output pulses from said first one-shot circuit; and a second one-shot circuit which is triggered by the trailing edge of the output pulses from said first one-shot circuit.

11. Apparatus for measuring the frequency of a reference signal which utilizes the color subcarrier signal of a color television receiver as a standard frequency signal, which comprises:

synthesizer means phase-locked to said reference signal for developing a synthesized color subcarrier signal;

means for generating bursts of said synthesized signal gated at the horizontal line rate of said color television receiver;

means for receiving a radio frequency signal from a television station;

means for amplitude modulating the received radio frequency signal with the bursts of said synthesized color subcarrier; and means for applying the output of said modulating means to the input of said color television receiver.

12. Apparatus for measuring the frequency of a reference signal which utilizes a color subcarrier signal as a standard frequency signal, which comprises:

synthesizer means phase-locked to said reference signal for developing a synthesized color subcarrier signal;

means for receiving a radio frequency signal, modulated by color bursts and horizontal sync pulses, from a television station;

means for demodulating the radio frequency signal to recover the color bursts and horizontal sync pulses;

means phase-locked to the color bursts for generating a local color subcarrier signal;

means for comparing the phase of said synthesized color subcarrier signal with the phase of the local subcarrier signal;

a television receiver screen; and means triggered by said horizontal sync pulses and delayed in accordance with the amplitude of the output of said comparing means for producing a bright dot on each horizontal line of the television screen and thereby generating on the screen a vertical line whose instantaneous horizontal position is a visual indication of the phase difference between the synthesized and local color subcarrier signals.

* * * * *